(12) United States Patent
Ininger et al.

(10) Patent No.: US 10,921,291 B2
(45) Date of Patent: Feb. 16, 2021

(54) METHOD FOR INSPECTING A WELD SEAM

(71) Applicant: Baker Hughes Oilfield Operations LLC, Houston, TX (US)

(72) Inventors: Jorg Ininger, Cologne (DE); Stephan Falter, Simmerath (DE)

(73) Assignee: Baker Hughes Oilfield Operations LLC, Houston, TX (US)

(*) Notice: Subject to any disclaimer, the term of this patent is extended or adjusted under 35 U.S.C. 154(b) by 61 days.

(21) Appl. No.: 15/551,687

(22) PCT Filed: Feb. 17, 2016

(86) PCT No.: PCT/US2016/018244
§ 371 (c)(1),
(2) Date: Aug. 17, 2017

(87) PCT Pub. No.: WO2016/134005
PCT Pub. Date: Aug. 25, 2016

(65) Prior Publication Data
US 2018/0067085 A1    Mar. 8, 2018

Related U.S. Application Data

(60) Provisional application No. 62/117,149, filed on Feb. 17, 2015.

(51) Int. Cl.
*G01N 29/26* (2006.01)
*G10K 11/34* (2006.01)

(52) U.S. Cl.
CPC ......... *G01N 29/262* (2013.01); *G10K 11/346* (2013.01); *G01N 2291/044* (2013.01);
(Continued)

(58) Field of Classification Search
CPC .... G01N 29/262; G01N 26/265; G01N 29/44; G01N 29/4463; G01N 29/4472;
(Continued)

(56) References Cited

U.S. PATENT DOCUMENTS 5,583,292 A * 12/1996 Karbach ............ G01N 29/223
                                                             73/588
2009/0165563 A1* 7/2009 McGrath ............ G01N 29/225
                                                             73/644

(Continued)

FOREIGN PATENT DOCUMENTS

| EP | 1398627 A2 | 3/2004 |
| EP | 1953544 A2 | 8/2008 |

OTHER PUBLICATIONS

International Search Report and Written Opinion issued in connection with corresponding PCT application No. PCT/US2016/018244 dated May 13, 2016.

*Primary Examiner* — Lisa M Caputo
*Assistant Examiner* — Rose M Miller
(74) *Attorney, Agent, or Firm* — Mintz Levin Cohn Ferris Glovsky and Popeo, PC; Lisa Adams

(57) ABSTRACT

A method for non-destructive inspection of a weld seam. An array of ultrasonic transducers is positioned such that the array of transducers extends over at least part of the width of the weld seam. Each transducer element in the array of transducer elements is excited so that each transducer emits an ultrasonic signal. A plurality of reflected ultrasonic signals are received at the array of transducer elements and the reflected ultrasonic signals are converted to electrical signals. The electrical signals are analyzed to identify a defect, or a plurality of defects.

18 Claims, 8 Drawing Sheets

(52) U.S. Cl.
CPC ............... *G01N 2291/106* (2013.01); *G01N 2291/2675* (2013.01)

(58) Field of Classification Search
CPC ....... G01N 2291/044; G01N 2291/106; G01N 2291/2675; G10K 11/346; G10K 11/34; G10K 11/345
USPC .................................. 73/626, 602, 625, 641
See application file for complete search history.

(56) References Cited

U.S. PATENT DOCUMENTS

| | | |
|---|---|---|
| 2011/0083512 A1* | 4/2011 | Imbert ............... G01N 29/0645 73/622 |
| 2013/0199297 A1 | 8/2013 | Imbert et al. |
| 2014/0165730 A1 | 6/2014 | Na |

\* cited by examiner

METHOD FOR INSPECTING A WELD SEAM

CROSS-REFERENCE TO RELATED APPLICATIONS

This application claims the benefit and priority of U.S. patent application Ser. No. 62/117,149, filed Feb. 17, 2015 and entitled WELD TESTING FOR TRANSVERSE DEFECTS USING PAINT-BRUSH METHOD, the entirety of which is incorporated herein by reference.

BACKGROUND

The subject matter disclosed herein relates to non-destructive inspection of a weld seam using the paint brush method. Manufacturing pipelines for oil and gas transportation involves welding sides of a sheet of metal to form a pipe, which results in a weld seam where the individual sides meet and join. The pipes can be longitudinally or helically welded. For welding comparably thin-wall pipe thicknesses, with an approximate maximum thickness of 20 mm, electro-resistive welding is advantageous. For thicker wall applications, surface-arc welding is typically applied. Most newly constructed pipelines have large diameters, e.g., 24 inches or larger, and must withstand high pressures applied during the transportation process. Due to these factors, surface-arc (SAW) welded pipes are typically employed in pipelines.

Weld seams must be tested and inspected to ensure the quality of the weld seam. Ultrasonic testing of weld seams is well established within the manufacturing process of both longitudinally and helically welded pipes. Ultrasonic testing is typically conducted at the end of the manufacturing process and can be regarded as a final verification of quality before the product is finished and approved for shipment to the customer. Due to the typical installation location of these pipes, the reliability of the testing needs to be very high. For example, the pipeline may be located such that a repair or later exchange is not easily possible. To ensure the quality of the pipeline, several standards have been published with which the testing process must comply.

In the same way, it is necessary to repetitively inspect welds and the body of pipelines in service, in order to ensure their integrity. Defects originally classified as tolerable need to be reclassified according to valid standards. Corrosion may lead to weaknesses in the weld and/or the pipe body material.

Defects typically found within weld seams can be classified into three categories: (1) longitudinal defects aligned along the weld axis; (2) transversal defects perpendicular to the weld axis; and (3) laminations within the heat-affected zone. The weld axis extends along the length of the weld seam. In an ultrasonic testing system, the selection and arrangement of ultrasonic transducers can be determined based on the published standards and the type of defect to be identified.

The standard method to test for detecting transversal defects typically employs four (4) transducers arranged in an X-formation, creating a pitch-catch scenario, as illustrated in FIG. 1. In this configuration, while transducer number 6 and transducer number 5 fire, a transversal defect will reflect the signals to each other, i.e., from transducer number 6 to transducer number 5 or from transducer number 5 to transducer number 6. Transducers 5 and 7 also function as a coupling check for transducers 6 and 8. In addition, each single transducer can also check for a 45 degree oblique defect by firing and receiving within one cycle per transducer. Various X-formations are installed for internal and external detection scenarios. The X-formation is advantageous in terms of signal-to-noise and geometry tolerance. However, in the pitch-catch X-formation, the sensitive area is restricted to the relatively small overlapping region of the sound fields from the representative transducers. Thus, the pitch-catch configuration is typically localized to inspecting the pipe surface.

For transversal defect testing, an on-bead solution is typically used in which the pitch-catch transducers are employed by positioning the transducers on the weld seam itself. In this configuration, illustrated in FIG. 2, transducers 3 and 4 are positioned opposite each other on a weld seam 12 of a pipe 14 and function as a coupling check for themselves. The transducers 3, 4 can be positioned on the weld root 1 or the weld bead 2. Internal and external defects can be detected directly in a pulse-echo configuration. However, only when the transducers 3, 4 are positioned directly on the middle of the weld seam is the beam sufficiently confined to detect a transversal defect or notch correctly. If the transducers 3, 4 are misaligned, e.g., transducer 3 moved to the right, as illustrated in FIG. 3, or if the weld root 1 and the weld bead 2 are not symmetrically positioned, the defect reflection will be deflected, as illustrated in FIG. 3, leading to a strong sensitivity drop on the transducers. Thus, this system is intolerant of the geometry changes that may be present in a weld seam and may not identify all transversal defects in a weld seam.

An alternative system, illustrated in FIG. 4, employs phased array transducers 10 instead of single crystal transducers positioned over the weld seam 12 to emit ultrasonic signals 9. When the geometry of the complete weld seam 12 is known, the positioning of defects and their angular reflection characteristics can be mathematically modeled or determined by trial and error methods and the correct delay laws applied to selected virtual probes. In this way, the defect signals can be optimized for an increased range covering more or less the complete weld seam area. However, in use, this approach may suffer from several drawbacks. First, if the geometry of the weld seam changes either within one pipe or from one pipe to another pipe, a new configuration of the virtual probes would be necessary. Due to the time consuming process of determining the correct virtual probe configuration, such a change in configuration is not practical in daily operation. Thus, this process is restricted to pipes where the weld seam geometry is well under control within the manufacturing process. Second, because of the scanned approach of virtual probes, a relatively large number of ultrasonic shots are needed to test the entire weld seam area. The larger the weld seam is, the more shots are needed and the more the test speed is reduced. Third, optimization is complex for a longitudinal weld seam, but is typically realistic for operators of automated testing systems. For helically welded pipes, the helix asymmetry adds an additional layer of complexity to the process that is typically considered too challenging for daily operations.

SUMMARY

A method for non-destructive inspection of a weld seam is described herein. An array of ultrasonic transducers is positioned such that the array of transducers extends over at least part of the width of the weld seam. Each transducer element in the array of transducer elements is excited so that each transducer emits an ultrasonic signal. A plurality of reflected ultrasonic signals are received at the array of transducer elements and the reflected ultrasonic signals are converted to electrical signals. The electrical signals are analyzed to identify a defect, or a plurality of defects. An advantage that may be realized in the practice of some disclosed embodiments of the method is deflections caused by non-uniformity of the geometry of the weld seam or misalignment of the defect can be compensated for as the signals reflected due to these geometries appear at a different position of the probe.

In an embodiment, a method of non-destructive inspection of a weld seam is described. An array of transducer elements is positioned to extend over at least part of a width of the weld seam. The method includes exciting each transducer element of an array of transducer elements to emit an ultrasonic signal. A plurality of reflected ultrasonic signals are received at the array of transducer elements and the reflected ultrasonic signals are converted to electrical signals. At least one set of delay laws are applied to the electrical signals to generate a plurality of virtual probes steered to a plurality of angles, foci, or a combination of angles and foci. A defect in the weld seam is identified by at least one of the virtual probes.

The above embodiments are exemplary only. Other embodiments are within the scope of the disclosed subject matter.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the disclosed subject matter encompasses other embodiments as well. The drawings are not necessarily to scale, emphasis generally being placed upon illustrating the features of certain embodiments of the invention. In the drawings, like numerals are used to indicate like parts throughout the various views.

DETAILED DESCRIPTION

Embodiments of the disclosed subject matter provide techniques for non-destructive inspection of a weld seam to identify defects. In an embodiment, an array of ultrasonic transducers is positioned such that the array of transducers extends over the width of the weld seam. Each transducer element in the array of transducer elements is excited so that each transducer simultaneously emits an ultrasonic signal. A plurality of reflected ultrasonic signals are received at the array of transducer elements and the reflected ultrasonic signals are converted to electrical signals. At least one set of delay laws are applied to the electrical signals to generate a plurality of virtual probes steered to a plurality of angles. A defect is identified by at least one of the virtual probes. Other embodiments are within the scope of the disclosed subject matter.

In the process of manufacturing a pipeline, two edges of a sheet or metal are welded together, longitudinally or helically, to form a pipe, resulting in a weld seam where the two sides meet and join. Various defects can be present in this weld seam. These defects fall into three main categories: (1) longitudinal defects; (2) transversal defects; and (3) laminations. Variations thereof, such as oblique defects, also occur and are additionally considered by some standards for special applications.

Figure 5:
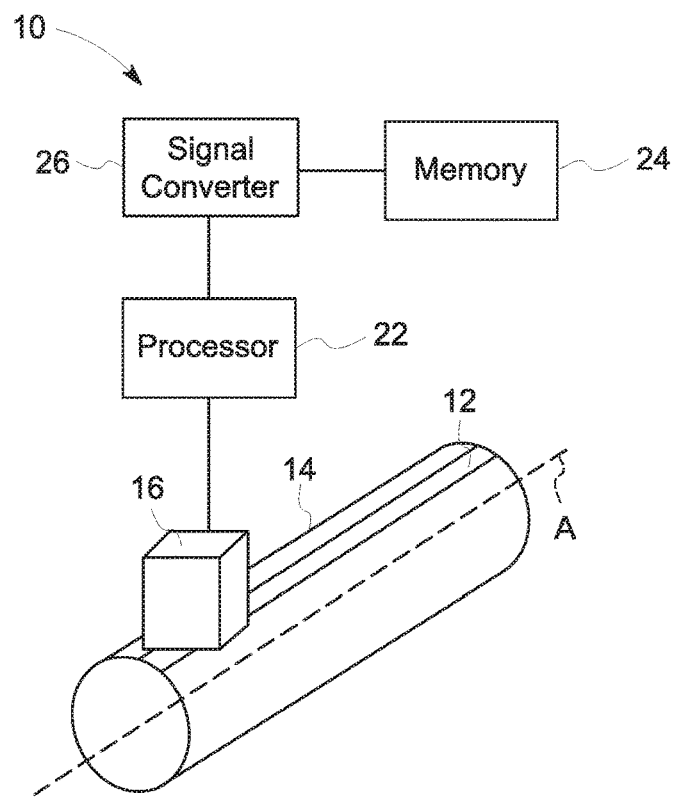
FIG. 5 is an illustration of a system for inspecting a weld seam.
Figure 6:
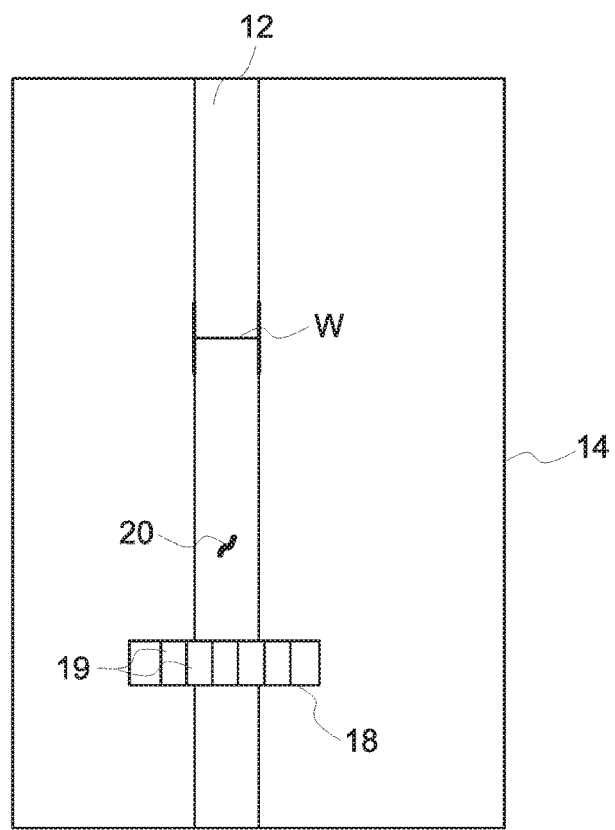
FIG. 6 is an illustration of a system for inspecting a weld seam.

FIGS. 5 and 6 illustrate a system 10 for non-destructively inspecting a weld seam 12. The weld seam 12 extends along the pipe 14 substantially parallel to the longitudinal axis A of the pipe 14. An ultrasonic sensor 16 is positioned over the weld seam 12. In the embodiment, the ultrasonic sensor 16 is centered over the weld seam 12, i.e., positioned on-bead, such that the ultrasonic sensor 16, and particularly the element direction of the ultrasonic sensor 16, is substantially perpendicular to the weld seam 12. In another embodiment, the ultrasonic sensor 16 is positioned at the root of the weld seam 12. Coupling between the ultrasonic sensor 16 and the pipe 14 is indirect. In an embodiment, a column of liquid, such as water or oil, is positioned between the ultrasonic sensor 16 and the pipe 14 in a quasi-immersion technique. This column of liquid allows an efficient coupling between the ultrasonic sensor 16 and the pipe 14, even in cases of geometric variations of the weld seam 12. Ultrasonic waves emitted by the ultrasonic sensor 16 are propagated in the liquid and transmitted through the liquid to the pipe 14. In an embodiment, the water column can be established by a wedge setup filled with water, squirters, or bubblers. In another embodiment, a wheel probe is applied with the array 18, stabilizing the coupling process while still being tolerant to weld seam 12 geometries.

A processor 22 can be coupled to the probe 16 and operable to analyze the reflected ultrasonic signals collected by the probe 16. A signal converter 26 can be coupled to the processor 22 for converting reflected ultrasonic signals to electrical signals. A memory 24 can be coupled to the processor 22 and/or signal converter 26 for storing the electrical signals.

Figure 7:
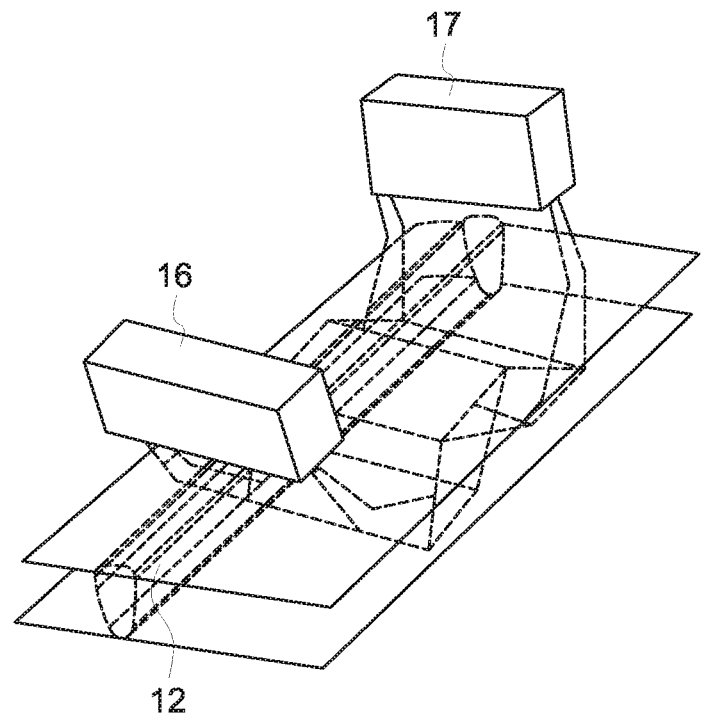
FIG. 7 is an illustration of a two-probe system for inspecting a weld seam.

As illustrated by FIGS. 6 and 7, the ultrasonic sensor 16 includes one or more transducer elements 19, such as an array 18 of ultrasonic transducers. In an embodiment, the array 18 includes a plurality of freely programmable transmitters. The array 18 of ultrasonic transducer elements 19 is sized and positioned such that when the array 18 of transducer elements 19 is placed over the weld seam 12, the array 18 of transducer elements 19 covers substantially the entire width W of the weld seam 12. The array 18 of transducer elements 19 can be a linear array, a two-dimensional array, or a three-dimensional array. The complexity of the array 18 can be selected based on the complexity of the geometry of the weld seam 12. The number of transducer elements 19 in the array 18 can be selected based on the desired size of the array 18. In an example, the number of transducer elements in the array 18 can be selected so that the array 18 is large enough to cover the entire width W of the weld seam 12. In an embodiment, the array 18 includes 64 transducer elements 19. In another embodiment, the array 18 includes 128 transducer elements 19.

Figure 8:
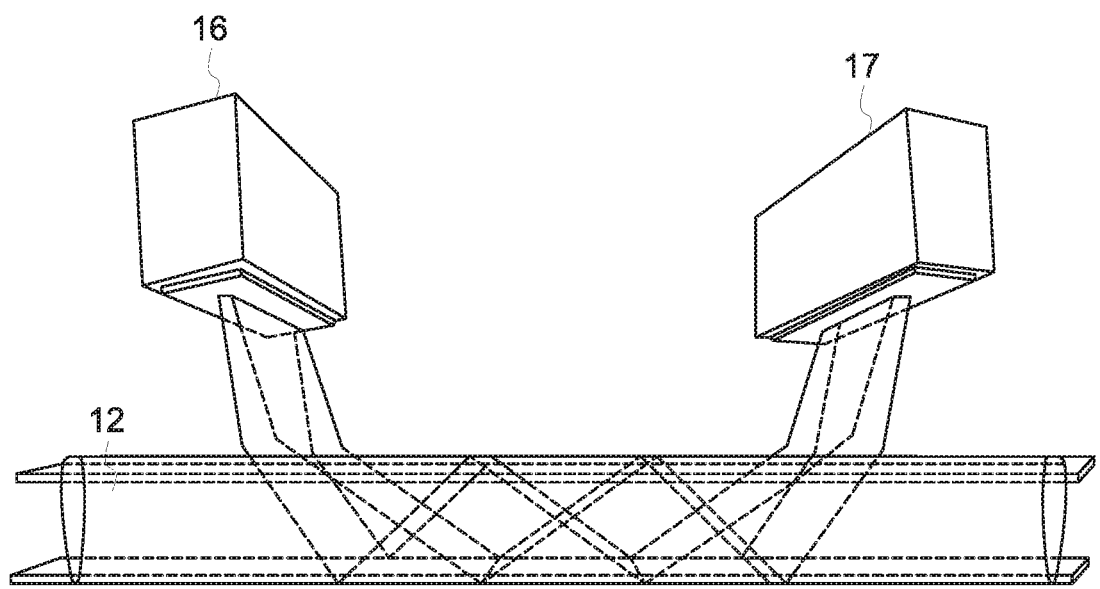
FIG. 8 is another illustration of a two-probe system for inspecting a weld seam.

In an embodiment, the array 18 of ultrasonic transducer elements 19 is operable in a pitch-catch or pulse-echo mode in which the transducer elements 19 emit ultrasonic signals and receive reflected ultrasonic signals. In another embodiment, illustrated by FIGS. 7-8, at least two ultrasonic sensors 16, 17 are positioned opposite each other on the weld seam 12. In an embodiment, the ultrasonic sensors 16, 17 are positioned with a relative inclination angle in the range of 15 degrees to 19 degrees. The addition of this second ultrasonic sensor 17 enables a coupling check of the ultrasonic sensor 16. Additionally, employing a second ultrasonic sensor 17 can enable detection of longitudinal defects. The array 18 of transducer elements 19 is operable to detect a defect 20 (FIG. 6). In an embodiment, a plurality of defects 20 can be detected in the weld seam 12. The defect 20 can be located on an outer or inner surface of the weld seam 12. The defect 20 can be a longitudinal defect, a transversal defect, or a lamination defect. The defect has a longitudinal component and a transverse component, the proportion of which is a function of the angle of the defect. The angle of the defect is defined relative to the longitudinal axis A of the pipe 14 and may be positive or negative. In an embodiment, transversal defects having an inclination angle within the range of −80 degrees to +80 degrees, such as −30 degrees to +30 degrees, −20 degrees to +20 degrees, or −15 degrees to +15 degrees can be detected.

Figure 1:
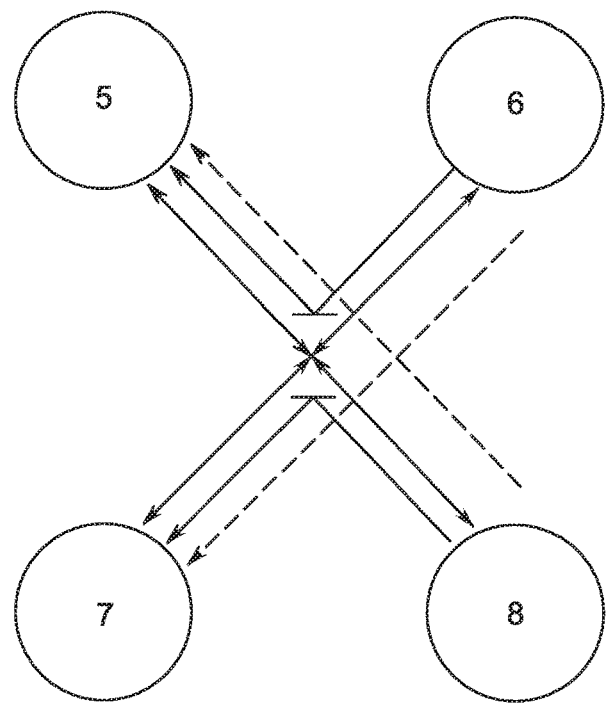
FIG. 1 is a diagram of a prior art single crystal pitch-catch transducer X-formation.
Figure 2:
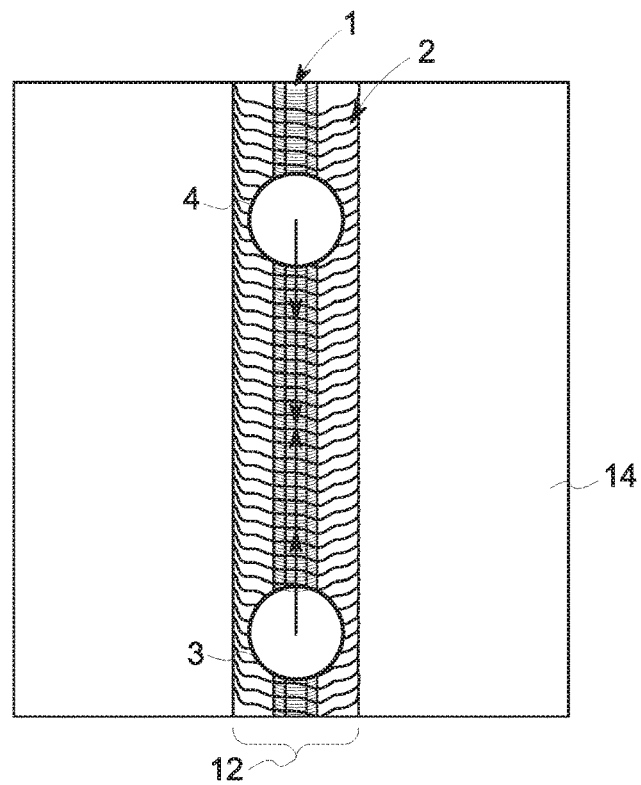
FIG. 2 is an illustration of a pitch-catch formation of transducers on a weld seam.
Figure 3:
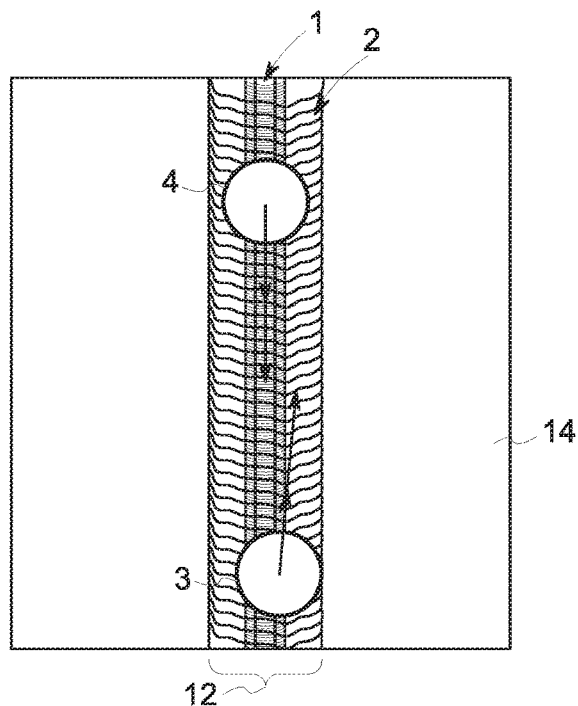
FIG. 3 is an illustration of a misaligned pitch-catch formation of transducers on a weld seam.
Figure 4:
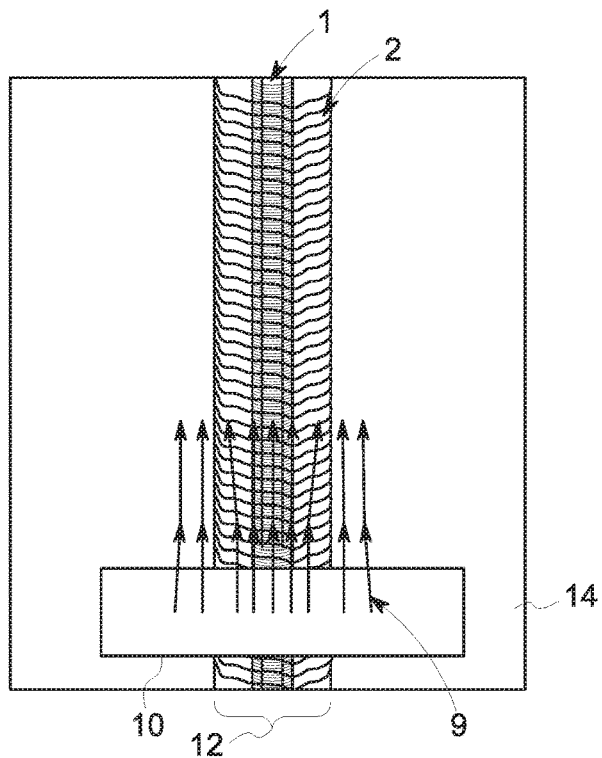
FIG. 4 is an illustration of a phased array formation of transducers on a weld seam.
Figure 11:
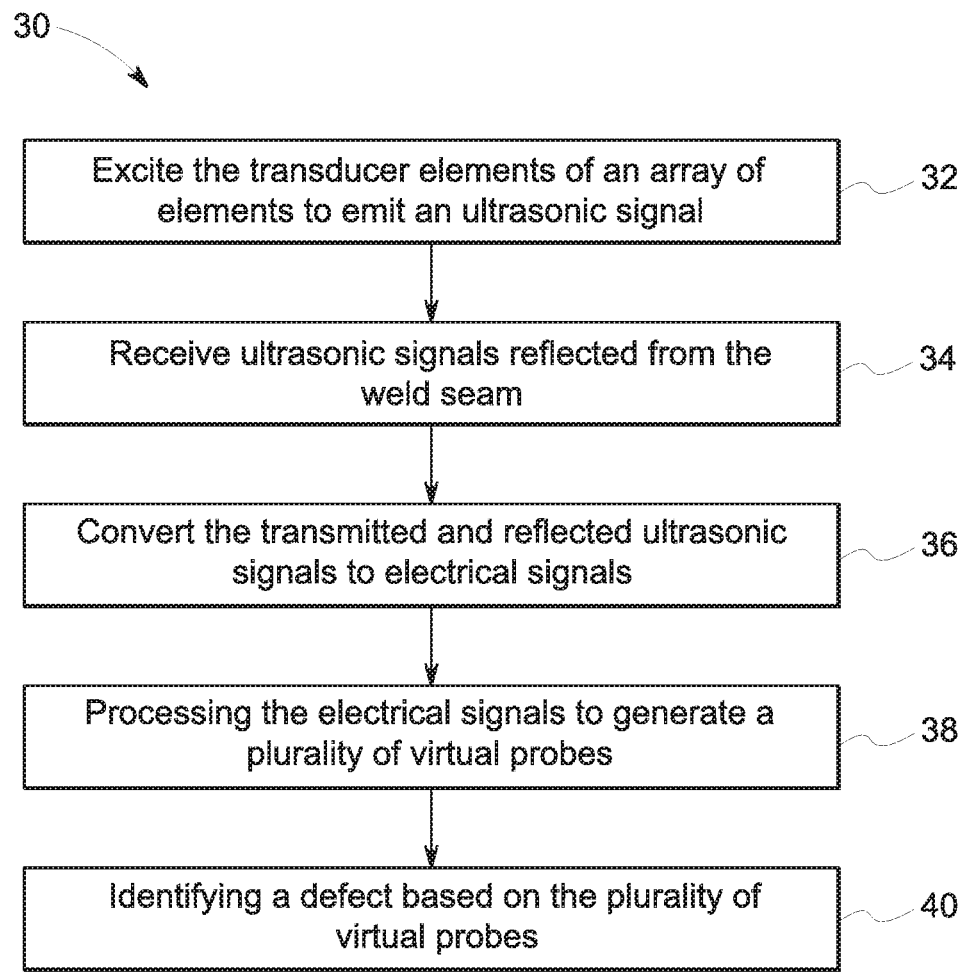
FIG. 11 is a flowchart illustrating a method of inspecting a weld seam.
Figure 12:
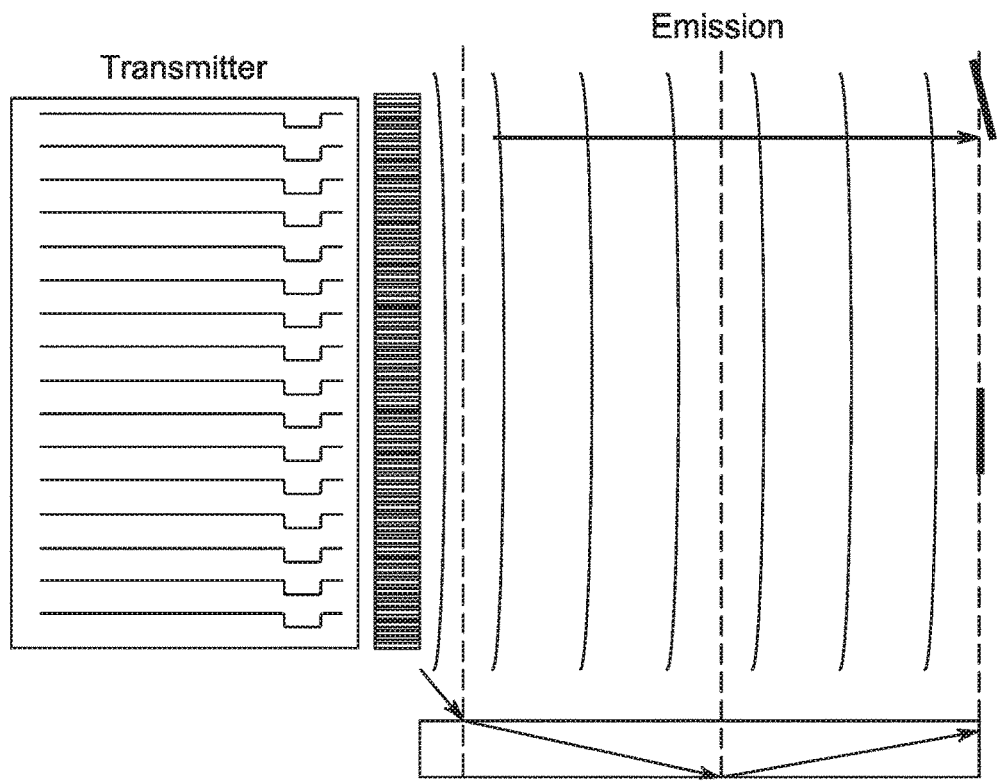
FIG. 12 is a chart of transmitted ultrasonic signals.

Referring to FIG. 11, a method 30 of inspecting a weld seam 12 is described. In an example, this method 30 employs the paint brush method. This method 30 can be employed by an ultrasonic inspection system, such as the system 10 (FIG. 5) described above. As discussed above, at least one ultrasonic probe including an array 18 of ultrasonic transducer elements 19 is positioned over a weld seam 12 of a pipe 14. At block 32, the transducer elements 19 of the sensor 16 are each excited to emit an ultrasound pulse wave or ultrasonic signal. In an embodiment, the transducer elements 19 are controlled in such a manner that they emit at the same time, substantially without a phase shift or time delay. In other words, the "physical deflection on emission" is zero. The emitted ultrasonic signal is transmitted to the weld seam 12. An example of the transmitted signals is illustrated in FIG. 12. As illustrated, when the emitted signal interfaces with the weld seam 12, the emitted signal is refracted. The emitted signal then travels from the weld seam 12 and the external surface of the pipe 14 to the internal surface of the pipe 14, is reflected back, and then travels to the external surface of the pipe and the weld seam 12 again, where the signal hits the weld bead 2 (FIG. 2). Due to the angle inclination, for conventional materials, during refraction, a mode conversion occurs from an incoming longitudinal wave to an outgoing transversal wave or signal.

In an embodiment, the emitted signal covers the entire width W of the weld seam 12. In another embodiment, the emitted signal covers the entire width W of the weld seam 12 and a portion of the heat affected zone of the pipe 14. The emitted signal is continuous and homogeneous within the physical limits at its creation. Homogenity will be influenced by the geometrical deviations due to the weld bead or the weld root of the weld seam 12, but the continuity remains. As a consequence, the weld and the heat affected zone of the pipe 14 can be affected by the ultrasonic signal.

Figure 9:
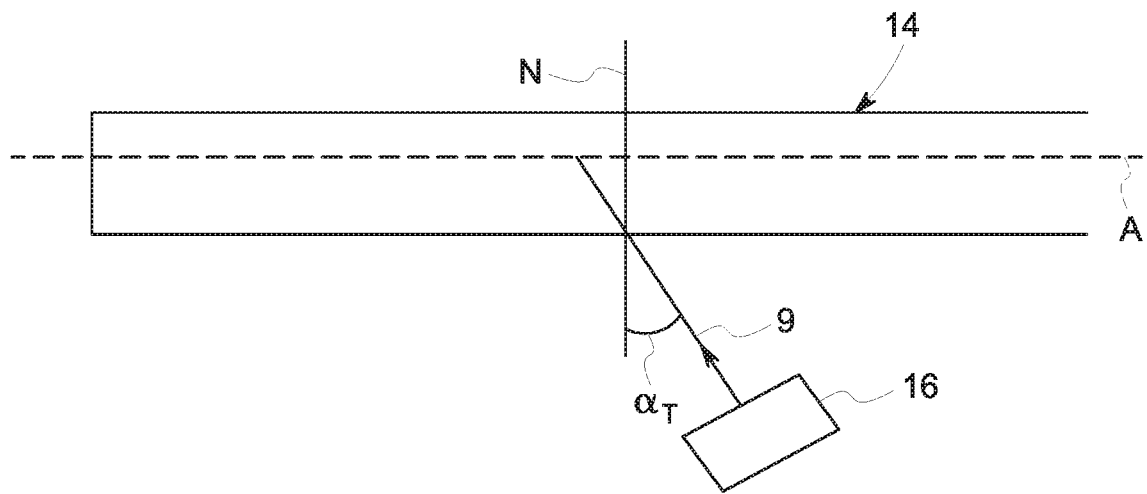
FIG. 9 is an illustration of an axial deflection angle of an ultrasonic signal.
Figure 10:
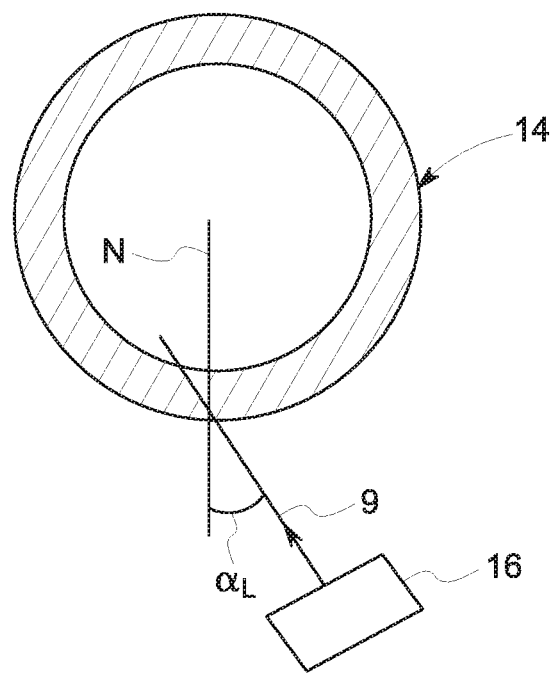
FIG. 10 is an illustration of a transverse deflection angle of an ultrasonic signal.

Referring now to FIGS. 5, 6, 9, and 10, the sensor 16 can be oriented so that it fires at the weld seam 12 in accordance with a transverse deflection angle $\alpha_L$ in order to detect longitudinal defects or in accordance with an axial deflection angle $\alpha_T$ in order to detect transverse defects. As illustrated in FIG. 9, an ultrasonic signal 9 forms at an angle $\alpha_T$ to the normal N of the pipe 14 in a longitudinal sectional plane of the longitudinal axis A of the pipe 14. As illustrated in FIG. 10, an ultrasonic signal 9 emitted by the ultrasonic sensor 16 forms an angle $\alpha_L$ relative to the normal N of the pipe 14, which is defined in a transverse section plane perpendicular to the longitudinal axis A of the pipe 14. These deflections have varying values depending on the propagation medium and the material of the pipe 12 (FIGS. 5 and 6) and weld seam 12. In an example, for detecting longitudinal defects, the angle $\alpha_L$ is 17 degrees and the angle $\alpha_T$ is zero while these values are reversed for detecting transverse defects. These values are adjusted for other angles of the defect 20. For example, for a defect angle of 45 degrees, the angles $\alpha_L$ and $\alpha_T$ correspond to deflections of approximately 12 degrees in the transverse plane and the longitudinal plane, respectively. These values can be varied within a range, such as −15 degrees to +15 degrees, in order to detect defects 20 having various inclination angles.

Figure 13:
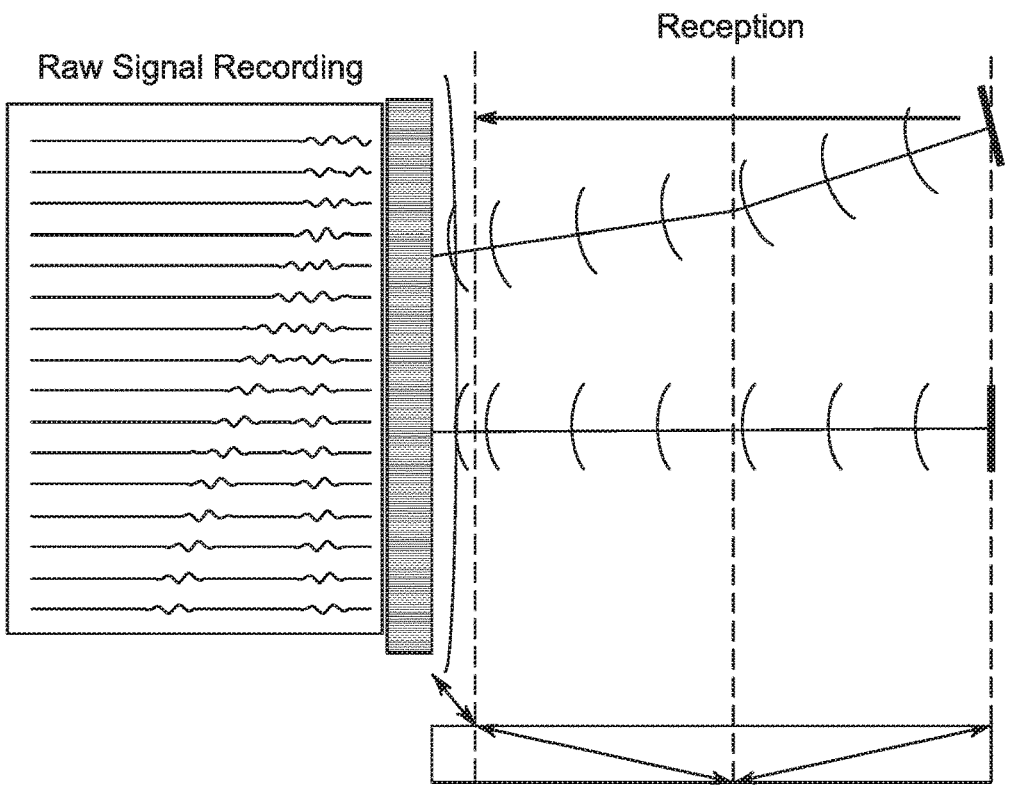
FIG. 13 is a chart of reflected ultrasonic signals.

At any position on or within the weld seam 12 or on the surface of the pipe 14, defects, such as cracks, can occur. When the ultrasonic signal encounters an anomaly or defect 20 in the weld seam 12, a portion of the ultrasonic signal is reflected. The way in which the ultrasonic signal is reflected depends on the defect shape, position, and orientation. As illustrated by FIG. 13, the reflected signals follow the reverse of the path of the emitted signal. At block 34 (FIG. 11), the ultrasonic signals reflected from the weld seam 12 (FIGS. 5 and 6) are received by the transducer elements 19, again without a time delay. The ultrasonic waves reflected by an anomaly or defect 20 are sensed on return by the transducer elements 19 and, at block 36 (FIG. 11), are converted into electrical signals, such as by the signal converter 26 (FIG. 5). In an embodiment, the signal converter 26 can be an analog-to-digital converter. These converted electrical signals can be stored in the memory 24 for later processing. In an embodiment, the transmitted signals can also be converted to electrical signals and stored in the memory 24.

At block 38 (FIG. 11), the electrical signals, representing the transmitted and reflected ultrasonic signals, are processed to generate a plurality of virtual probes. In order to generate the virtual probes, at least one set of delay laws are applied to the transmitted electrical signals and the corresponding reflected ultrasonic signals. In an embodiment, the delay laws are selected by measuring time of flight between all of the transducer elements 19 and the surface of the weld seam 12 and extracting a delay law to apply to the electrical signals based on the measured time of flight. The applied delay laws can be selected so that an angular range indicated as a critical path is densely covered by test-shot angles, ensuring that at least one of the resulting virtual probes detects a defect 20. The delayed electrical signals are added up or summed to form the virtual probes, each virtual probe representing a probe 16 steered to a particular deflection angle. A "virtual" deflection of the beam is constructed on the reflected signals by staggering the instances at which the received signals are added up, for each transducer element 19.

Figure 14:
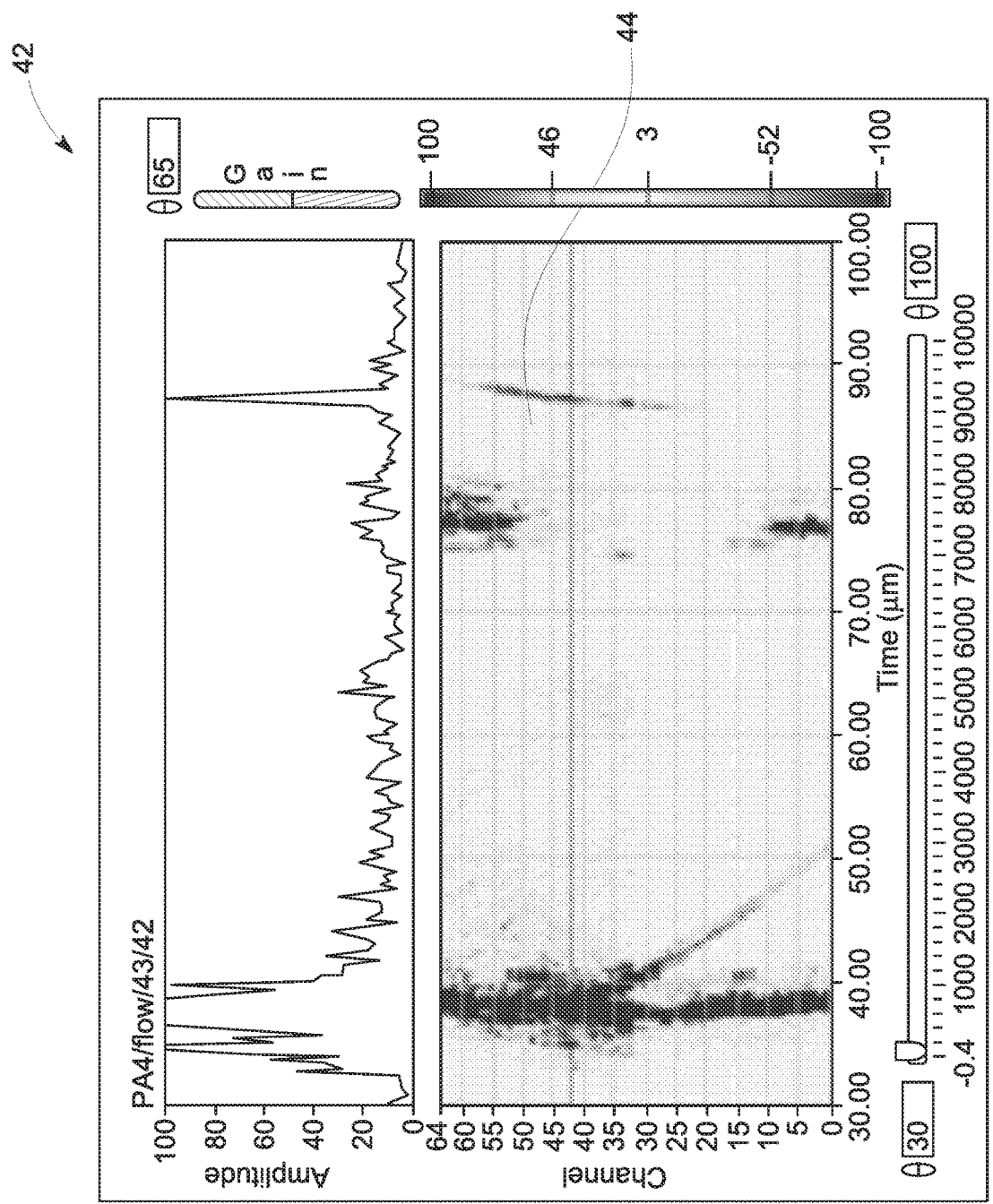
FIG. 14 is an A-scan of summed electrical signals.

Based on the summed signals, a visual representation 42 (FIG. 14) of the summed signals can be generated. This visual representation 42 can take the form of an A-scan, B-scan, or any other suitable type of representation. At block 40 (FIG. 11), a defect 20 in the weld seam 12 can be identified based on the plurality of virtual probes. In an embodiment, the defect 20 is identified from the visual representation 42, e.g., A-scan, in which a defect signature 44 is present. In an embodiment, an A-scan of the summed data is compared to an A-scan of the raw, unsummed data in order to identify the defect signature.

In an embodiment a single defect 20 or a plurality of defects 20 in the weld seam 12 can be identified. The defect(s) 20 can be a transversal defect, a longitudinal defect, or a lamination defect. In an embodiment, the defect 20 is a transversal defect having an inclination angle in the range of −90 degrees to +90 degrees, such as in the range of −15 degrees to +15 degrees. In an embodiment, a time inversion algorithm can be applied to compensate for directional variation induced by the geometry of the weld seam 12.

Due to the application of the full phased-array probe, which spans the width of the weld seam, deflections caused by non-uniformity of the geometry of the weld seam or misalignment of the defect can be compensated for. The signals reflected due to these geometries simply appear at a different position of the probe. In addition, since only a single physical scan is necessary and all processing and beam steering occur electronically after the physical scan, the speed of processing can be increased.

In view of the foregoing, embodiments of the invention provide a method for non-destructively inspecting a weld seam to identify a defect. A technical effect is to compensate for non-uniformity of geometry or misalignment of the defect.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof "At least one of element A, element B, and element C" is not intended to be limited to at least one of an element A, at least one of an element B, and at least one of an element C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of non-destructive inspection of a weld seam, comprising:
  positioning an ultrasonic sensor including an array of transducer elements over a weld seam of a pipe, wherein the weld seam extends parallel to a longitudinal axis of the pipe and wherein the transducer elements are arranged in a direction substantially perpendicular to the weld seam;
  exciting each transducer element of the array of transducer elements to emit an ultrasonic signal in which the array of transducer elements is positioned to extend over at least part of a width of the weld seam;
  receiving a plurality of reflected ultrasonic signals at the array of transducer elements;
  converting the reflected ultrasonic signals to electrical signals;
  measuring time of flight between all of the transducer elements and a surface of the weld seam;
  selecting at least one set of delay law based on the measured time of flight;
  applying the selected at least one set of delay laws to the electrical signals to generate a plurality of virtual probes steered to a plurality of angles, foci, or a combination of angles and foci; and
  identifying, by at least one of the virtual probes, a defect in the weld seam.

2. The method of claim 1, further comprising applying a time inversion algorithm to the electrical signals to compensate for changes in geometry of the weld seam.

3. The method of claim 1, wherein the array of transducers are positioned on the weld seam in an on-bead configuration.

4. The method of claim 1, wherein the defect comprises a longitudinal defect, a transversal defect, or a lamination defect.

5. The method of claim 1, wherein the array of transducers is at least partially submerged in a fluid to facilitate transmission of the ultrasonic signals.

6. The method of claim 1, wherein the ultrasonic signals are emitted without a time delay and the reflected signals are received without a time delay.

7. The method of claim 1, wherein applying the at least one set of delay laws electronically applies a delay in the transmission of the electronic signal to steer the beam of a virtual probe to a particular angle, foci, or combination of angle and foci.

8. The method of claim 7, wherein a variety of virtual probes are generated steered at a range of beam angles.

9. The method of claim 1, wherein the defect comprises an inclination angle within a range of −15 degrees to 15 degrees.

10. The method of claim 1, wherein a second array of transducer elements is positioned opposite the array of transducer elements to carry out a coupling check with the array of transducer elements.

11. The method of claim 1, further comprising storing the electrical signals in memory.

12. The method of claim 1, wherein the transducer elements of the array of ultrasonic transducer elements simultaneously emit the ultrasonic signal.

13. The method of claim 1, wherein the array of ultrasonic transducers is positioned to extend over an entire width of the weld seam.

14. The method of claim 1, further comprising generating a B-Scan or geometry corrected B-Scan.

15. The method of claim 14, further comprising applying an image-processing algorithm to the B-Scan to detect or characterize image features with respect to a potential defect.

16. The method of claim 1, wherein positioning the ultrasonic sensor further comprises centering the ultrasonic sensor over the weld seam.

17. The method of claim 1, wherein the emitted ultrasonic signal covers the entire width of the weld seam.

18. The method of claim 1, wherein the transducer elements are arranged in a two-dimensional or three-dimensional array.

* * * * *